Jan. 30, 1923.
L. GALLEGOS.
TIRE CARRIER.
FILED JULY 15, 1921.
1,443,817.
2 SHEETS—SHEET 2.
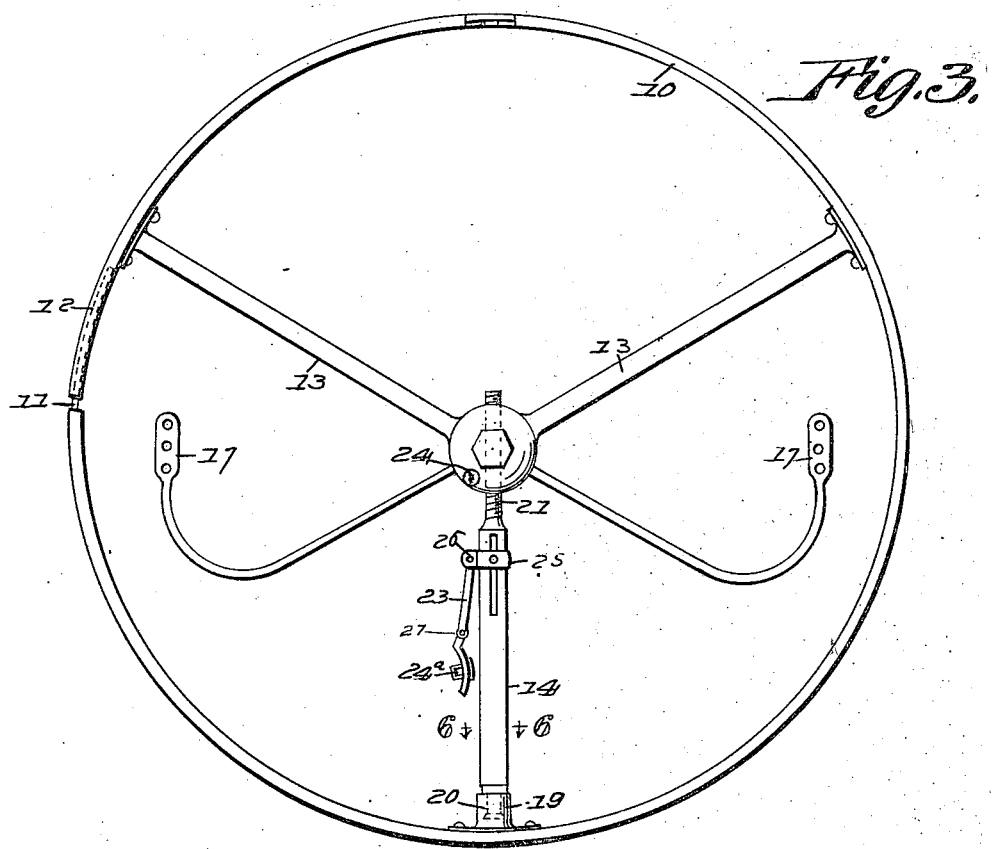
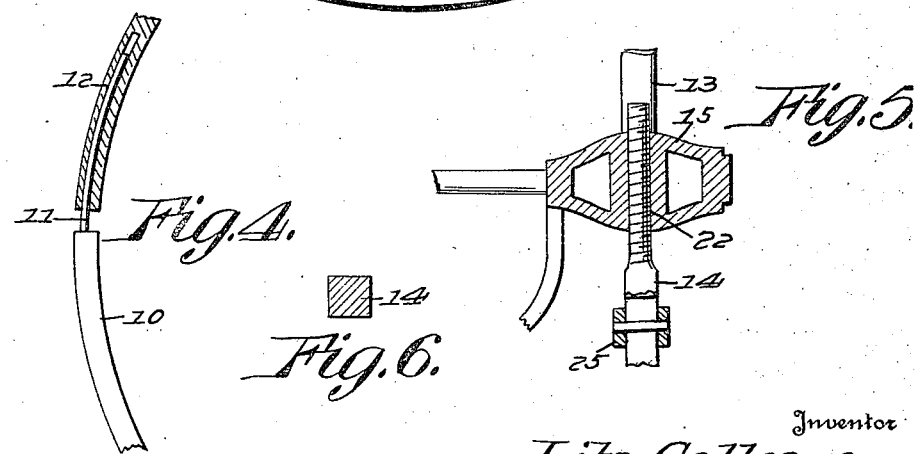
Inventor
Lito Gallegos,
By E. Hume Talbert
Attorney Patented Jan. 30, 1923.

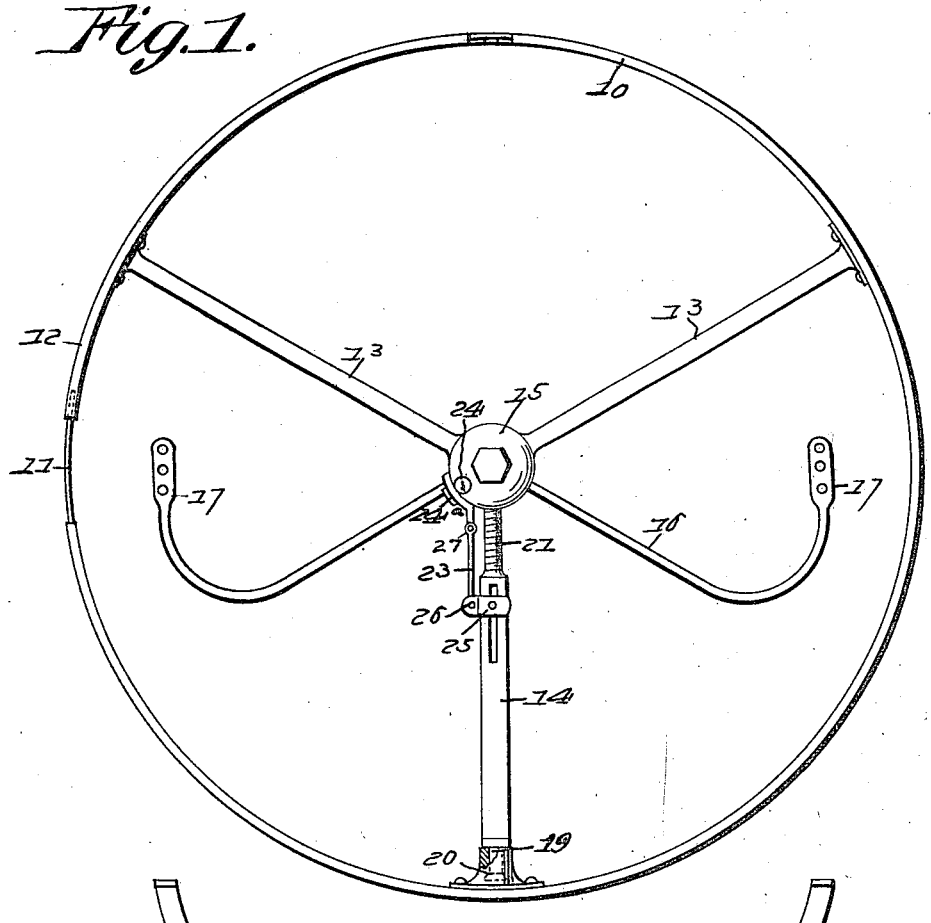
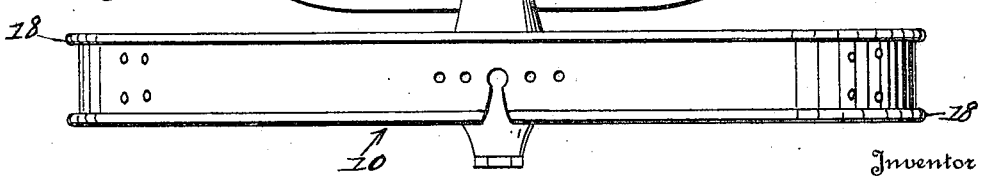

1,443,817

UNITED STATES PATENT OFFICE.

LITO GALLEGOS, OF AGUILAR, COLORADO.

TIRE CARRIER.

Application filed July 15, 1921. Serial No. 484,871.

*To all whom it may concern:*

Be it known that LITO GALLEGOS, a citizen of the United States of America, residing at Aguilar, in the county of Las Animas and State of Colorado, has invented new and useful Improvements in Tire Carriers, of which the following is a specification.

The object of the invention is to provide a simple and efficient means attachable to the rear or other suitable portion of a vehicle of the automobile or similar type for carrying an extra tire under such conditions as to prevent accidental or surreptitious displacement or removal thereof; and with this object in view the invention consists in a construction and combination of parts of which a preferred embodiment is shown in the accompanying drawings, wherein:—

Figure 1 is an elevation of a carrier embodying the invention.

Figure 2 is a plan view of the same.

Figure 3 is a view similar to Figure 1 with the seating ring collapsed as when applying or removing an extra tire.

Figure 4 is a detail view of the joint between the extremities of the seating ring.

Figure 5 is a detail section of the connection between the jack and the hub of the carrier.

Figure 6 is a cross sectional view of the jack spoke on the plane indicated by the line 6—6 of Figure 3.

The device consists essentially of a seating ring 10 of the split ring type preferably having interlocking extremities wherein one is provided with a guide pin 11 to fit in a guide bore 12 of the other, the space bounded by the ring being spanned by radially disposed spokes 13 and 14 connected by a central hub 15 which is provided with means whereby it may be attached to a vehicle.

In the construction illustrated the attaching means consist of supporting arms 16 radiating from the inner end of the hub and provided with terminal fastening plates 17 adapted to be secured by screws or bolts to any suitable portion of the wood work or frame of the vehicle.

The spokes 13 of which two are shown in the drawing consist essentially of bars which are secured at their outer ends to the seating ring, which latter may be grooved as shown in Figure 2 with the lateral retaining flanges 18 and may be either secured to or integral with the hub, while the other spoke consists of a jack which is extensible in dimensions to serve as a spreading and contracting means for the ring. This jack spoke in the construction illustrated is swivelled as at 19 in a bearing 20 secured to the ring 10 and is threaded at its other end as shown at 21 for engagement with a diametrically threaded opening 22 in the hub, while carried by the jack spoke is a hasp 23 for engagement by a lock 24 on the hub to secure the jack spoke against rotation when an adjustment thereof suitable to snugly fit the seating ring to the inner side of the tire or demountable rim carrying the tire, has been effected.

The body portion of the jack spoke while adapted to be of any cross sectional shape is square or angular, as shown in Figure 6, and in order that the hasp may be adapted for engagement with the lock 24, to secure the body portion of the jack spoke against rotation at any adjustment of the latter, the hasp is connected with the jack spoke by means of a carrier 25 consisting of a sleeve to which the hasp is pivotally connected as at 26. Also the hasp is preferably jointed as at 27 to facilitate engagement of the staple 24$^a$ with the lock.

The sleeve forming the carrier for the hasp is provided with a guide pin 28 operating in a slot 29 in the body portion of the jack spoke.

It will be noted that in the operation of the jack spoke to expand the ring the hasp which is adapted to be arranged in radial relation with the body portion of the said spoke may serve as an operating lever to apply power to the jack, after which by the engagement of its free end with the locking means on the hub, the jack will be secured against reverse rotary movement.

Having described the invention, what is claimed as new and useful is:—

1. A tire carrier having an expansible split seating ring spanned by radial spokes connected by an intermediate hub, and means for securing the hub to a supporting object, one of said spokes consisting of a jack having a revoluble body portion, and an operating lever carried by the body portion of the jack spoke for engagement with a lock on the hub.

2. A tire carrier having an expansible split seating ring spanned by radial spokes connected by an intermediate hub, and means for securing the hub to a supporting object, one of said spokes consisting of a jack having a revoluble body portion, and an operating lever carried by the jack spoke and provided with terminal means for locking the same against rotary movement.

3. A tire carrier having an expansible split seating ring spanned by radial spokes connected by an intermediate hub, and means for securing the hub to a supporting object, one of said spokes consisting of a jack having a revoluble body portion, and a hasp pivotally mounted upon the jack spoke for extension at an angle thereto to constitute an operating lever and terminally engageable with a locking device on the hub.

4. A tire carrier having an expansible split seating ring spanned by radial spokes connected by an intermediate hub, and means for securing the hub to a supporting object, one of said spokes consisting of a jack having a revoluble body portion, and means for locking the jack spoke in its adjusted positions, the same consisting of a carrier slidingly mounted upon the body portion of the spoke, a hasp pivotally mounted upon said carrier and means for securing the extremity of the hasp to the hub.

In testimony whereof he affixes his signature.

LITO GALLEGOS.